United States Patent [19]
Biedermann et al.

[11] Patent Number: 5,546,460
[45] Date of Patent: Aug. 13, 1996

[54] ECHO COMPENSATION DEVICE AND 4/2-WIRE INTERFACE HAVING SUCH AN ECHO COMPENSATION DEVICE

[75] Inventors: Rolf Biedermann, Hamminkeln; Burkhard Telges, Rhede, both of Germany

[73] Assignee: Siemens Aktiengesellschaft, Munich, Germany

[21] Appl. No.: 428,103

[22] PCT Filed: Oct. 12, 1993

[86] PCT No.: PCT/DE93/00968

§ 371 Date: Jun. 12, 1995

§ 102(e) Date: Jun. 12, 1995

[87] PCT Pub. No.: WO94/10760

PCT Pub. Date: May 11, 1994

[30] Foreign Application Priority Data

Oct. 27, 1992 [DE] Germany .......................... 42 36 272.5

[51] Int. Cl.⁶ .................................................... H04B 3/23
[52] U.S. Cl. .................. 379/411; 379/410; 379/402
[58] Field of Search ..................... 379/411, 410, 379/402, 406; 370/32.1

[56] References Cited

U.S. PATENT DOCUMENTS

| | | | |
|---|---|---|---|
| 3,633,105 | 1/1972 | Lender et al. | 375/236 |
| 3,789,560 | 2/1974 | Wood . | |
| 3,798,560 | 3/1974 | Taylor | 364/724.2 |
| 4,064,379 | 12/1977 | Horna | 379/411 |
| 4,381,561 | 4/1983 | Treiber | 370/24 |
| 4,388,724 | 6/1983 | Gockler | 375/232 |
| 4,852,036 | 7/1989 | Kobayashi | 379/410 X |
| 4,922,530 | 5/1990 | Kenney et al. | 379/411 |
| 5,172,411 | 12/1992 | Gazsi | 379/402 |
| 5,175,763 | 12/1992 | Gazsi | 379/402 |
| 5,179,575 | 1/1993 | Pierce et al. | 375/232 |
| 5,192,918 | 3/1993 | Sugiyama | 381/71 X |
| 5,386,472 | 1/1995 | Pfaff et al. | 381/71 |
| 5,396,299 | 3/1995 | Greenberg | 348/614 |

FOREIGN PATENT DOCUMENTS

| | | |
|---|---|---|
| 0448754 | 10/1991 | European Pat. Off. . |
| 0448753 | 10/1991 | European Pat. Off. . |
| 3141502 | 7/1982 | Germany . |

OTHER PUBLICATIONS

"Adaptive Signal Processing", Bernard Widrow et al., (1985) Prentice Hall, Englewood Cliffs, New Jersey, USA pp. 338–347 in conjunction with pp. 15–29.

"A Signal–Processing Codec Filter for PCM Applications", D. Vogel et al., published in Siemens Forschungs–und Entwicklungsberichte 15 (1985) No. 5. Berlin, W. Germany pp. 253–258.

*Primary Examiner*—Jeffery Hofsass
*Assistant Examiner*—Devendra Kumar
*Attorney, Agent, or Firm*—Hill, Steadman & Simpson

[57] ABSTRACT

An echo compensation device, having a digital transverse filter, for an information transmission system is described, as well as a 4/2-wire interface having at least one such device. Accordingly, a scale value device is provided which respectively evaluates the value of the input signal and also the values of the time-delayed signals of the transverse filter and establishes a scale value as a function thereof. Furthermore, a device is provided for scaling all the signal values with the associated scale value before these are weighted with the respectively assigned filter coefficients. After addition of the weighted scaled signal values has been performed, the value of the output signal is descaled with the same scale value with which the signal values had previously been scaled.

8 Claims, 1 Drawing Sheet

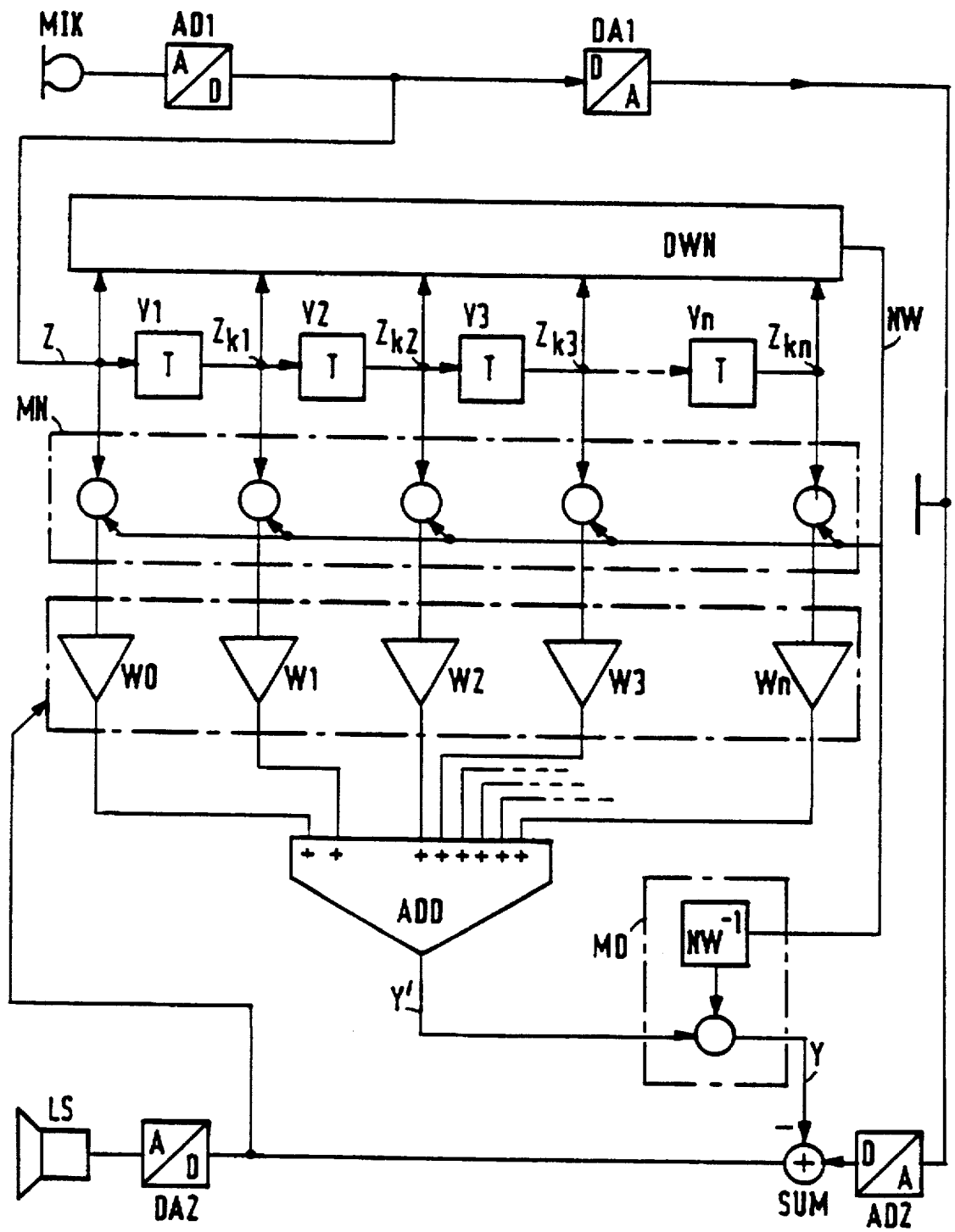

5,546,460

ECHO COMPENSATION DEVICE AND 4/2-WIRE INTERFACE HAVING SUCH AN ECHO COMPENSATION DEVICE

BACKGROUND OF THE INVENTION

The invention relates to an echo compensation device, which has a digital filter in the form of a digital transverse filter having one input, for an information transmission system. It relates in particular to a hybrid circuit—also termed a 4-wire/2-wire interface—having such an echo compensation device.

The general problems of such hybrid circuits are described in the book "ADAPTIVE SIGNAL PROCESSING" by B. Widrow and S. D. Stearns, 1985 Prentice Hall, Englewood Cliffs, N.J., U.S.A., on pages 338 to 347 in conjunction with pages 15 to 29. In particular, FIG. 12.30 on page 344 shows a block diagram of an information transmission system having an adaptive echo compensation device, of which the signal characteristic model is represented in FIG. 12.31 on page 345 and which is described on pages 344 to 346. A suitable FIR filter (Finity Impulse Response filter) is shown as an adaptive transverse filter having one input in FIG. 2.2 on page 17 and described on pages 16 and 17. In the case of such a filter, an input signal is led via an iterative network of delay elements having a delay factor of the same size, the output signal of one delay element being provided in each case as the input signal for the following delay element. Both the input signal of the overall circuits and the output signals of all the delay elements are respectively weighted with a coefficient, and these weighted values are added to form a joint output signal. In the case of a hybrid circuit having an adaptive filter, the coefficients are automatically adapted during operation to the respective operating conditions, in particular to the line length and the reflection factor of the system. Less convenient hybrid circuits, which in the case of use in normally unchangeable network regions guarantee an adaptation of the input impedance of the hybrid circuit to the line to a sufficient extent, use filters having fixed coefficients tuned to the line. Fundamentals of suitable adaptation algorithms are explained on pages 19 ff. of the abovementioned book. Particularly favorably suited is a so-called MMSE method (Minimum Mean-Square Error, also LMS for Least Mean-Square), which takes account of the minimum mean-square error.

Special problems of hybrid circuits having an echo compensation device and their solution are treated in DE-C 31 41 502 (U.S. Pat. No. 4,381,561), U.S. Pat. No. 3,633,105, U.S. Pat. No. 3,798,560, EP-A 0 448 753 (U.S. Pat. No. 5,175, 763) and EP-A 0 448 754 (U.S. Pat. No. 5,172,411). An embodiment of such a 2/4-wire hybrid circuit and of its mode of operation, is described in the article "A Signal-Processing Codec Filter for PCM Applications" by D. Vogel, E. Schmid, J. Reisinger and L. Lerach, published in Siemens Forschungs— und Entwicklungsberichte 15 (1985) No. 5, Berlin, W. Germany on pages 253 to 258. This article treats a hybrid circuit whose echo compensation device contains an adaptive FIR filter which with the aid of the Leaky-LMS adaptation algorithm balances the echo path on the 4/2-wire interface in order thereby to extinguish the echo occurring on the hybrid.

U.S. Pat. No. 4,064,379 describes an echo compensation device for a hybrid circuit in which analog input signal are sampled in time-discrete fashion and are convened into a digital code using the A law. The sample values and the coefficients are stored in shift registers and multiplied in logarithmic form by addition in a summing device to form an output signal value.

It is common to all the previously described hybrid circuits that computational inaccuracies occur, owing to word length restriction, in the signal processor required to realize the filter. Because of such computational inaccuracies, the echo compensation device respectively used cannot operate with quiet input signals or low input levels.

SUMMARY OF THE INVENTION

The object of the present invention is to provide a hybrid circuit having an echo compensation device or to provide one such echo compensation device by means of which echo suppression is guaranteed even in the case of low input signal levels.

In general terms the present invention is an echo compensation device for an information transmission system having a digital transverse filter for amplitude-discrete and time-discrete input signals. The echo compensation device has a series circuit of identical delay elements, the instantaneous input signal value and the time-delayed signal values respectively being weighted with a coefficient and added in a summing device to form an output signal value. A scale-value device evaluates all the respective signal values and outputs a scale value established as a function of this evaluation. A device is provided for scaling all the respective signal values with this scale value. A further device is provided for descaling the output signal value of the summing device with the same scale value.

The present invention is also a 4-wire/2-wire interface having at least one echo compensation device which contains a digital transverse filter for amplitude-discrete and value-discrete input signals.

Advantageous developments of each of the above embodiments are as follows.

The scale-value device determines the respective maximum signal value and outputs a scale value established as a function of this maximum signal value.

The scale value is linearly dependent on the respective maximum signal value.

The digital transverse filter is an adaptive digital filter.

According to the invention, in the case of an echo compensation device of the generic type for an information transmission device provision is made of a scale value device which, respectively with a timing prescribed by the operating time of the delay element, evaluates all the signal values, that is to say both the value of the input signal and the values of the time-delayed signals, and establishes a scale value on the basis of this evaluation of all the signal values. Also provided according to the invention is a device for scaling all the respectively current signal values with the associated scale value. In this case, scaling is normally understood to be either a division by the scale value or a multiplication by the scale value.

Small signal values occurring in the case of a quiet input signal are converted by this scaling into larger signal values before they are weighted with the respectively assigned filter coefficients. These calculations essential for the filter function are thus always carried out with relatively large signal values independently of the actual size of the input signal value and of the corresponding time-delayed signal values.

According to the invention, after addition of the weighted scaled signal values has been performed, the value of the output signal is descaled with the same scale value with which the signal values had previously been scaled. Descaling is understood in this case as the application of a calculation specification to a signal which cancels the application of the scaling calculation specification. If the scaling has been carried out by multiplication, the descaling is therefore carried out by division by the multiplier of the scaling, and if the scaling was a division specification the descaling specification is a corresponding multiplication specification. It is particularly favorable if the scaling factor is derived from the respectively largest signal value.

In the case of a particularly simple exemplary embodiment of the present invention, the scale value device determines the largest signal value, the device for scaling divides all the signal values by this largest signal value and the device for descaling multiplies the end result of the addition of the weighted scaled signal values by the value of the largest signal value determined. The scale value can, however, also be selected in any other way to be proportional to the largest signal value determined.

A hybrid circuit according to the invention or a 4-wire/2-wire interface uses a previously described echo compensation device.

BRIEF DESCRIPTION OF THE DRAWING

The features of the present invention which are believed to be novel, are set forth with particularity in the appended claims. The invention, together with further objects and advantages, may best be understood by reference to the following description taken in conjunction with the accompanying drawing, and in which:

The single FIGURE shows an exemplary embodiment of a 4-wire/2-wire interface according to the invention with the use of an echo compensation device according to the invention.

DESCRIPTION OF THE PREFERRED EMBODIMENTS

In the exemplary embodiment shown in the single FIGURE, an analog signal source, for example a microphone MIK, provides a signal Z via a first analog-to-digital converter AD1. In the exemplary embodiment represented, this signal Z is sent via a first digital-to-analog converter DA1 onto an analog 2-wire line and sent back, partially reflected by the latter, and superimposed on a signal emitted by a signal source (not represented), to the 4-wire/2-wire interface via a second analog-to-digital converter AD2. The output signal of the analog-to-digital converter AD2 is led to a summing point SUM, and the output signal of this summing point is transmitted via a second digital-to-analog converter DA2 to an analog signal sink, for example a loudspeaker LS.

The digital signal Z serves as the input signal for a transverse filter having a series circuit of identical delay elements V1, V2, V3 ... Vn. In this case, each delay element V1, V2 etc. respectively provides at its output the value, delayed by the period T, of the signal present at its input. The delay element V1 thus provides at its output the signal value $Z_{k1}$ which corresponds to the signal value Z present before the time T at its input. The same relationship obtains between the signal values $Z_{k2}$ at the output of the delay element V2 or at the input of the delay element V3 as well as the signal values $Z_{k3}$ ... and $Z_{kn}$. A scale value device DWN determines for each change in the signal values Z, $Z_{k1}$, $Z_{k2}$ ... $z_{kn}$ the respectively largest value of these values, and as a function thereof provides a scale value NW at its output. All the signal values Z, $Z_{k1}$, $Z_{k2}$, ... $Z_{kn}$ are scaled, in a device MN for scaling, with the same scale value NW assigned to them. The scaled signal values are then each weighted with the filter coefficients W0, W1, W2, W3, ... or Wn assigned to them and then added in a summing device ADD. The signal Y' resulting therefrom is descaled in a device MD for descaling with the same scale value NW which was previously used to scale the input signals. Furthermore, the reciprocal value NW of the calculation specification which was used in the scaling is applied in the descaling. The device MD for descaling provides at its output an output signal Y of the transverse filter. This output signal Y is subtracted in the summing device SUM from the output signal of the analog-to-digital converter AD2, the aim being to compensate in this way an echo of the signal Z which was possibly transmitted back.

An adaptive transverse filter is used in the exemplary embodiment represented in the figure, and this is represented by a control tap for setting the coefficients W0, W1, W2 ... . Wn at the output of the summing circuit SUM.

It is preferred to realize the echo compensation devices according to the invention by means of appropriately controlled signal processors.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. An echo compensation device for an information transmission system having a digital transverse filter for amplitude-discrete and time-discrete input signals, comprising:

a series circuit of identical delay elements, an instantaneous input signal value and time-delayed signal values of the instantaneous input signal respectively being weighted with respective coefficients in a weighting device and added in a summing device to form an output signal value;

a scale-value device for evaluating all respective signal values of the instantaneous input signal value and the time-delayed signal values and for outputting a scale value established as a function of this evaluation;

a scaling device for scaling all the respective signal values with said scale value; and, a descaling device for descaling the output signal value of the summing device with said scale value.

2. The echo compensation device as claimed in claim 1, wherein the scale-value device determines a maximum signal value of the instantaneous input signal value and the time-delayed signal values and outputs a scale value established as a function of this maximum signal value.

3. The echo compensation device as claimed in claim 1, wherein the scale value is linearly dependent on a maximum signal value of the instantaneous input signal value and the time-delayed signal values.

4. The echo compensation device as claimed in claim 1, wherein the digital transverse filter is an adaptive digital filter.

5. A 4-wire/2-wire interface having at least one echo compensation device which contains a digital transverse filter for amplitude-discrete and value-discrete input signals, comprising;

a series circuit of identical delay elements, an instantaneous input signal value and time-delayed signal values of the instantaneous input signal respectively being weighted with respective coefficients in a weighting device and added in a summing device to form an output signal value;

a scale-value device for evaluating all respective signal values of the instantaneous input signal value and the time-delayed signal values and for outputting a scale value established as a function of this evaluation;

a scaling device for scaling all the respective signal values with said scale value; and a descaling device for descaling the output signal value of the summing device with said scale value.

6. The 4-wire/2-wire interface as claimed in claim 5, wherein the scale value device determines a maximum signal value of the instantaneous input signal value and the time-delayed signal values and outputs a scale value established as a function of this maximum signal value.

7. The 4-wire/2-wire interface as claimed in claim 5, wherein the scale value is linearly dependent on a maximum signal value of the instantaneous input signal value and the time-delayed signal values.

8. The 4-wire/2-wire interface as claimed in claim 5, wherein the digital transverse filter is an adaptive digital filter.

* * * * *